UNITED STATES PATENT OFFICE.

BERNHARD CONRAD STUER AND WALTER GROB, OF AACHEN, GERMANY, ASSIGNORS, BY MESNE ASSIGNMENTS, TO THE CHEMICAL FOUNDATION, INC., A CORPORATION OF DELAWARE.

PROCESS FOR THE MANUFACTURE OF PRODUCTS FROM ACETYLENE.

1,421,743.     Specification of Letters Patent.     Patented July 4, 1922.

No Drawing.     Application filed November 11, 1916. Serial No. 130,928.

*To all whom it may concern:*

Be it known that we, BERNHARD CONRAD STUER, a subject of the Netherlands, and WALTER GROB, a subject of Switzerland, and residents of Aachen, Stolberg 2, Rhineland, Germany, have invented certain new and useful Improvements in a Process for the Manufacture of Products from Acetylene, of which the following is a specification.

The invention relates to the manufacture of products obtained by passing acetylene, or mixtures of acetylene with other gases, capable of reacting with acetylene for instance ammonia or hydrogen sulphide, or with vapours, for instance steam, or mixtures of acetylene with gases and vapours, over contact subtsances at high temperatures. If the contact substances used for such reactions are catalyzers which act only by means of surface contact, such as for instance burnt clay, pumice stone, asbestos and the like, very poor results are obtained. Better results are obtained by using as contact substances metal compounds, for instance metal oxides which are capable of reduction by acetylene.

It has béen found that satisfactory results may be obtained with metallic compounds by using them in the form of compounds containing water of hydration, by providing that there should be present other substances containing water of hydration, or by utilizing as contact substances simultaneously catalyzing metal compounds containing water of hydration, and additional substances containing water of hydration.

According to this invention, among the suitable catalyzers are metal hydrates, such as hydrated compounds of iron. These compounds give off water during the reactions, and at the same time they are reduced by the action of the acetylene. In place of the hydrates, may be used hydrated oxide compounds with a smaller proportion of water, for instance, those obtained by slight heating of hydrates, or of other metal compounds that can be converted into oxides. Care however must be exercised in order to avoid a complete dehydration of the contact substances, such as would be produced by strong calcining, as in that case they would lose their efficiency as well as their ability to again absorb water.

The efficiency of the above-mentoned cata- lyzers is enhanced by the presence of additional substances containing water of hydration, more particularly of those which have the property to absorb, as well as to give off, water at higher temperatures. Such substances are, for instance, hydrates of alumina and of magnesia, and hydrated silicates.

In the presence of such activating substances even the less efficient catalyzers may be successfully used. Thus for instance in the manufacture of acetaldehyde from moist acetylene the efficiency of iron oxalate or iron carbonate and the like, or of oxides obtained therefrom, is improved by the addition of hydrate of alumina, hydrate of magnesia, etc.

Among the efficient catalyzers which are capable of reduction by acetylene, are the iron compounds, preferably the hydrates, that can be converted into oxides. In place of the iron compounds, hydrates and compounds of other metals that can be converted into oxides, for instance copper, nickel, cobalt, manganese, chromium cerium, vanadium may be used. In many cases it is advisable to use mixtures of two or more compounds capable of a catalytic action.

Minerals occurring in nature and containing hydrated iron or hydrated iron compounds, such as bog iron ore, bauxite and hydrated iron-aluminum silicates have been found to be satisfactory contact substances.

Suitable contact substances may be manufactured in various ways. Thus, by way of example, hydrated iron precipitated from solutions of acid salts, may be mixed with substances which in themselves are indifferent or very slightly active, such as carbonates or sulphates of alkaline earths with clay, cement and the like. In addition iron hydrate may be precipitated together with hydrate of alumina from solutions of the salts. Or iron hydrate is precipitated upon hydrated aluminium- or magnesium-silicates, such as fuller's earth, zeoliths and the like held in suspension in solutions of its salts.

It has been further found advantageous to submit contact substances, more particularly such as, in addition to metal compounds capable of reduction by acetylene, contain also hydrate-containing compounds, such as for instance bog iron ore, and the like, before they are used, to a partial reduction under such conditions that the said reaction does not yield the free metal. To that end the contact mass may be treated, for instance, with hydrogen, carbon monoxide, mixtures of hydrogen and carbon monoxide and other reducing gases, preferably at a temperature which does not materially exceed 400° C. It has also been found advantageous to carry out the partial reduction of the contact substance with moist gases. In carrying out the reactions, these partially reduced contact masses are preferably used under conditions which will avoid a further reduction to metal by the action of acetylene, for the formation of metal favors the undesired decomposition of the acetylene with the formation of carbon. For this reason, it is advisable to avoid the use of excessively high temperatures. The partially reduced contact substances possess the advantage that the formation of the more valuable reaction products of lower boiling point is favorably influenced and, whilst the formation of reaction products with a higher boiling point is retarded. When acetylene, or acetylene diluted with neutral gases, is passed over partially reduced bog-iron ore, or the like, less acetylene will be decomposed with formation of carbon, than when non-reduced, or completely reduced, contact substances are used. The oxidation of acetylene to carbon monoxide and carbon dioxide, always accompanying the manufacture of products from acetylene, which is liable to lead to difficulties for instance during the reaction between acetylene and ammonia owing to the formation of ammonium carbonate and ammonium carbamate, is prevented, or at least strongly retarded, by the use of the partly reduced contact substances.

The presence of substances yielding oxygen, such as chromic acid, chromates, nitrates, and the like, in the contact substance has been found to be advantageous. Instead of using substances yielding oxygen, the process may be carried out by adding to the reaction gases small quantities of oxygen, or substances giving off oxygen may be used simultaneously with small quantities of oxygen. Working in the presence of substances giving off oxygen, or with the addition of oxygen, chiefly favors oxidation reactions, for instance the formation of acetaldehyde and acetic acid, by passing a mixture of acetylene and steam over contact substances. If mixtures of acetylene and oxygen are treated so as to obtain acetaldehyde and acetic acid, it is advisable to use a large excess of acetylene and to avoid excessively high temperatures, for instance those above 380° C., as otherwise large quantities of acetylene will be lost in the form of carbon monoxide and carbon dioxide.

But even in pure synthetic reactions, for instance in the reaction of acetylene with ammonia, or hydrogen sulphide, the presence of small quantities of oxygen or of substances giving off oxygen, or of both, is an advantage, as their presence retards the formation of high molecular products, and thus favors the formation of the more valuable simpler products.

Finally, the presence in the contact substance of such substances, as compounds of the alkalis, alkaline earths, and magnesium, which for example, have the property of assisting the re-oxidation of iron oxide reduced by the action of acetylene, has also proved advantageous.

The contact substances of this invention are suitable for the manufacture of oxygen-containing products obtained from acetylene and steam, as well as of nitrogen-containing products obtained from acetylene and ammonia and of sulphur-containing products obtained from acetylene and hydrogen sulphide or from other sulphur-containing gases. When mixtures of these gases or vapours, for instance acetylene, steam and ammonia, are used, products are formed which, like aldehyde ammonia, contain both oxygen and nitrogen. When acetylene and steam are used, synthetic products as well as products of oxidation, are formed. The presence of a little steam assists the formation of synthetic products, whilst a large quantity of steam and high temperatures assist the formation of oxidation, products such as for instance acetaldehyde and acetic acid.

The formation of the synthetic products and of the oxidation products begins generally at about 250° C. As a rule, the temperatures between 300° C. and 400° C. are the most suitable. In the presence of steam, particularly in considerable quantities, it is best to use temperatures of 400°–500° C. At temperatures above 500° C., the formation of carbon dioxide generally becomes very prominent. The synthetic and oxidation reactions according to this invention may be carried out at an ordinary, as well as at an increased, pressure.

When such processes are carried out, more particularly those which take place in the absence of steam, or in the presence of a little steam, substances are formed which volatilize with difficulty, and which cover the surface of the contact substance and affect its action. This disadvantage may be materially avoided by the use of partially reduced contact material.

Furthermore, in accordance with the invention, contact material which has lost its activity, may be regenerated by passing over it, at a high temperature, oxygen or oxygen-containing gases, such as air, preferably moist, and in that way oxidizing the high molecular carbon compounds and other impurities. In certain cases, it is advisable to use a subsequent treatment of the contact material with steam or water for the purpose of hydrating the compounds partly dehydrated during the treatment with oxygen.

In the manufacture of sulphur-containing products of acetylene and sulphur-containing gases, for instance, sulphide of hydrogen, it has been found that, in addition to the above mentioned contact substances, metals or substances containing metals may also be successfully used, preferably in a state of fine division. For instance, compact metals, such as nickel in the form of bands or wires, might be used as a contact material. During the passage of acetylene substances are then produced similar to coal or containing high molecular carbon compounds, the said substances containing the metal used, such as nickel, copper, iron, in a state of fine division and constituting contact substances having an excellent action. Thus in the manufacture of sulphur-containing synthetic products, it is possible to start successfully with a contact substance which, in the course of the process is completely or partly reduced to metal, or with a contact substance, the metal compound of which has been entirely or partly converted, before the process, into the form of metal by an extensive reduction. A very efficient contact substance containing metallic nickel for the manufacture of sulphur-containing products may, for example, be obtained by mixing hydrated nickel-oxide with cement, and treating the mixture solidified in the air, with hydrogen at 300–350° C. Similarly, materials containing completely reduced iron oxides or hydrated iron oxide, such as, for instance, bauxite reduced at 500°–600° C., constitute excellent contact substances for the production of sulphur-containing compounds.

*Example 1.*—A mixture containing acetylene and a multiple quantity of steam for example, four times the quantity of acetylene is passed at 400–420° C. over bog iron ore. The gases escaping from the reaction vessel are condensed, and the portion which does not condense, is deprived of the volatile reaction products by washing with water, glacial acetic acid or other absorbent, if desired, with cooling, and then they may again be passed over the contact substance. Acetaldehyde will be obtained as the chief product of the reaction. In addition there will appear small quantities of products of higher molecular weight such as acetone aldehyde. A portion of the acetaldehyde will have been oxidized further to acetic acid. If the passage is effected only once, 15–16% of acetylene is converted into acetaldehyde. The temperature of the reaction is generally between 300–600° C., but even at higher temperatures, considerable quantities of acetaldehyde are obtained.

*Example 2.*—Acetylene charged with a small amount of steam by passing it through water at a suitable temperature, is passed over bog iron ore which has been first partly reduced by passing hydrogen over it at 350° C. The reaction gases are condensed by cooling to about 70–80°, then further cooled for the purpose of obtaining the more volatile ingredients, and finally washed with water or other solvent for acetaldehyde, which may be cooled. The condensate is a yellowish-green to brown oil which is lighter than water, and when water in excess is used, it will separate as a well-defined upper layer. The condensate contains higher aldehydes, acetone, alcohol, acetic acid and homologues, furfurane derivitives, phenols, creosote-like products and, in addition hydrocarbons, resin- and tar-like substances. The condensate insoluble in water may be separated into its constituents by fractional distillation, and has valuable technical properties; thus, for instance, it is a good solvent for resins.

*Example 3.*—Acetylene and ammonia are passed at about 350°–380° C., over bauxite. The escaping gases are condensed, and subsequently washed, if desired with cooling, with water, xylol or other means of absorption. Unconsumed ammonia is recovered from the residual gases by washing with water or by condensation and is again brought into the reaction. The reaction products will comprise nitriles and nitrogen-containing bases, more particularly acetonitrile will be formed to the extent of 50% of the acetylene used, in addition picoline and its homologous pyridine bases together with the pyrroles and other nitrogen-containing products.

The special action of the hydrated contact substances, or of products poorer in water obtained from them by slight heating, becomes particularly noticeable in the reaction of ammonia on acetylene, for when the present contact substances are used, only such substances are obtained as contain the two carbon atoms of the acetylene bond, whilst, for instance, when metal contact substances are used, or metal oxides, under conditions in which they are reduced to metals, cyanide of hydrogen or cyanide of ammonium is obtained, that is to say products which are formed by splitting the carbon bond of the acetylene.

*Example 4.*—Acetylene and hydrogen sulphide, for instance in the proportion of 2 to 1, are passed at 300° C. over contact substances produced by mixing nickel hydroxide with cement, and subsequently drying at 300° C. The escaping gases are condensed by cooling with water, and then washed with soda lye for the purpose of removing the non-consumed hydrogen sulphide, the lye at the same time absorbing a portion of the sulphur-containing reaction products. The condensate contains a mixture of various sulphur compounds from which mercaptan, thiophene, methylthiophene, etc., may be obtained by fractional distillation.

*Example 5.*—Acetylene and hydrogen sulphide are passed at 320° C. over bauxite. The condensate obtained by cooling the reaction gases, contains 35% of sulphur, and is a clear transparent liquid upon repeated distillation, it distils almost entirely below 120°. It is therefore a practically pure thiophene. Products of higher molecular weight are formed only in small quantities.

What we claim is:—

1. A process for the manufacture of products from acetylene which comprises passing acetylene in conjunction with another reaction gas over a hydrated metal compound at a temperature of 250° to 500° C.

2. A process for the manufacture of products from acetylene which comprises passing acetylene in conjunction with another reaction gas over a hydrated metal oxide at a temperature of 250° to 500° C.

3. A process for the manufacture of products from acetylene which comprises passing acetylene in conjunction with another reaction gas over a hydrated iron oxide at a temperature of 250° to 500° C.

4. A process for the manufacture of products from acetylene which comprises passing acetylene in conjunction with another reaction gas over bog iron ore at a temperature of 250° to 500° C.

5. A catalyst for effecting reactions with acetylene containing an iron compound and hydrated alumina.

6. A catalyst for effecting reactions with acetylene containing a metallic compound and an oxygen yielding compound.

7. The process of producing catalysts for effecting reactions with acetylene which comprises partially dehydrating and partially reducing hydrated iron oxide.

8. The process of producing catalysts for effecting reactions with acetylene which comprises partially dehydrating and partially reducing bog iron ore.

9. The process of producing catalysts for effecting reactions with acetylene which comprises passing a reducing gas over a hydrate containing iron compound at approximately 400° C. and terminating the reaction before metal is formed.

10. The process of producing catalysts for effecting reactions with acetylene which comprises passing hydrogen containing gas over a hydrated iron oxide at approximately 400° C. and terminating the reaction before metal is formed.

11. The process of producing catalysts for effecting reactions with acetylene which comprises passing a moist reducing gas over a hydrated iron oxide at approximately 400° C. and terminating the reaction before metal is formed.

12. A process for the manufacture of products from acetylene which comprises passing acetylene and hydrogen sulphide over a hydrated metal compound at a temperature of from about 250° to 500° C.

13. A process for the manufacture of products from acetylene which comprises passing acetylene and hydrogen sulphide over a reduced, but free from metal, hydrated metal compound at a temperature of from about 250° to 500° C.

14. A process for the manufacture of products from acetylene which comprises passing acetylene and hydrogen sulphide over a reduced, but free from metal, hydrated metal oxide at a temperature of from about 250° to 500° C.

In testimony whereof we have signed our names to this specification in the presence of two subscribing witnesses.

Dr. BERNHARD CONRAD STUER.
Dr. WALTER GROB.

Witnesses:
    Henry C. A. Damm,
    Henry Anadflieg.